Aug. 8, 1950 — H. O. KOCH — 2,517,886
LINE SNATCH LINK
Filed Aug. 28, 1944
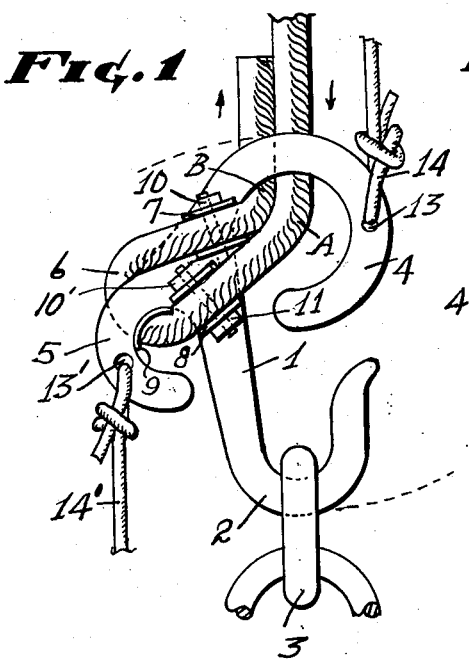
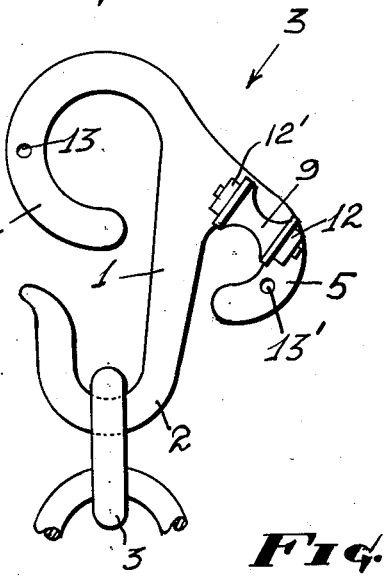
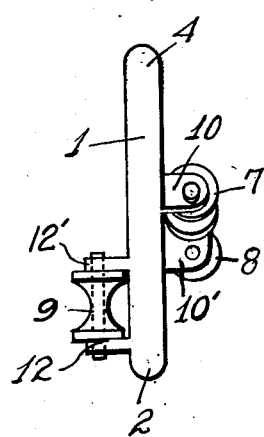
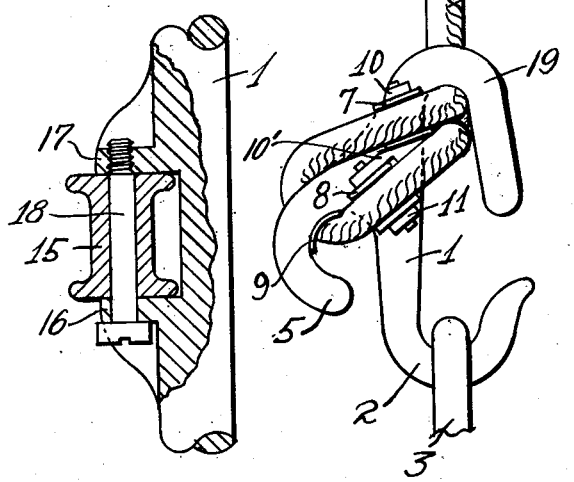
INVENTOR.
HARRY O. KOCH Patented Aug. 8, 1950

2,517,886

UNITED STATES PATENT OFFICE 2,517,886

LINE SNATCH LINK

Harry O. Koch, Wichita, Kans.

Application August 28, 1944, Serial No. 551,603

1 Claim. (Cl. 24—73).

This invention relates to a line snatch link, and has for its principal object roller means journalled on the link to avoid excess friction of the line on the link at the time of varying tension imposed on the lines, in other words, at the time of lifting or releasing a load carried by the line and link.

A still further object of this invention is to construct a link having a circular form through which a lapped portion of a load carrying line will engage in such position as to force one of the folds to seat on the other fold to bind the same snugly against the body of the circular formed structure to permanently avoid sliding movement of the line longitudinally until the link as a whole is rocked on its longitudinal center transverse to the line folds where they pass through the link to disengage them from each other, after which the line is free to slide in either direction selectively and then relocked by automatic retraction of the link to its normal position.

A further object of this invention is to provide a link that is comparatively inexpensive to produce, and to which a line is readily applied and easily operated under a high tension with respect to a load carried by the line.

These and other objects will hereinafter be more fully explained, reference being had to the drawing forming a part of this specification, and in which like characters will apply to like parts in the different views.

Referring to the drawings:

Fig. 1 is a side view of the link having a line applied thereto.

Fig. 2 is a reversed side view to that of Fig. 1, to show the rollers as positioned thereon, the line omitted.

Fig. 3 is an end view of the link looking in direction of arrow 3 in Fig. 2.

Fig. 4 is an enlarged fragmentary view of a modification for mounting a roller on the body of the link, said roller and portion of the body adjacent thereto being sectionally shown.

Fig. 5 is also a modification to illustrate a slotlike opening wherein the lines pass through to insure one line seating on the other to bind the lines against slipping under vibration or overstrain of a load.

The invention herein disclosed consists of a link comprising a body 1, vertically disposed and having a hooklike structure 2 integrally joined thereto at its lower extremity, said hook to be engaged by a load or anchor links 3. The upper end of the body is provided with a circular structure 4 for the purpose later described, said hooklike structure 2 and circular structure 4 extending outward in the same direction from the body portion.

Adjacent the circular structure and oppositely extending from the body to that of the circular and hooklike structures is a hook 5 around which a line 6 will engage, lapping back on its self, and from thence the lapped portion will extend through the circular structure 4. The line being thus applied to the link will function as a takeup and release for a load carried by line portion A, which in turn under its tension will bind line portion B firmly between line A and the said circular structure 4 as an anchor against slipping movement of said line. It will now be seen that the line engagement elsewhere on the link will be carried on rollers 7, 8, and 9, said roller 9 being on one side of the link while the rollers 7 and 8 are on the other side of the link, all of said rollers being journalled in their respective ears 10, 10', 11, 12, 12', said ears being integrally joined to the link as shown clearly in Fig. 3, whereby excess friction is eliminated at the time of sliding the line on the link as said line will move freely as the rollers turn.

It will be understood that the line applied to the link as above described will bind itself permanently under the weight of a load as the axis strain or tension on the link is substantially in parallelism with its body portion I while the fold of the line laterally crosses the said axis to pass through the circular structure, whereby the arc of the structure will cause one portion of the line to bind the other portion snugly against the inner side of the structure a spaced distance from the axis tension of the link for tight engagement. To release the tension thus obtained the link is rocked on its longitudinal or vertical axis in direction indicated by dotted lines in Fig. 1, to release the binding strain of the load carrying line against the other portion of the line, to release the same for a retracted movement to lower the load, while on the other hand a load is easily raised without rocking the link from its normal load carrying position. As a simple and efficient means to rock the link it will be seen that the circular structure and line retaining hook have apertures 13 and 13' and their respective lines 14 and 14' secured in the apertures, said lines extending in opposite directions to function as rocking means for the link and being manually operated.

To operate the invention it will be seen that by a pull downward on line portion A as in direction of an arrow, and an upper pull on line portion B as indicated by its arrow a load will be raised. To lower the load, the link will first be rocked as indicated by dotted lines to separate the lines in the circular structure after which line portion movements will be reversed from that shown by the arrows and the rollers will respond accordingly.

In Fig. 4 the position of a roller 15 is modified by setting the same inward of the link surface to place the line in close relation to the surface of the link, said roller being journalled in a pair of ears 16 and 17 through the medium of a bolt 18. While in Fig. 5 the circular structure is modified by changing its opening to slotlike form to avoid the load carrying line from moving sidewise from its seating engagement on the other line portion, whereby a positive lock for the lines at that point is assured, and such other modifications may be employed as lie within the scope of the appending claim.

Having fully described my invention what I claim as new and desire to secure by Letters Patent is:

In a line snatch link of the class described having an elongated body with a hook-like structure on each end thereof, said structures extending from the body in the same direction and the openings of said hooks being confrontingly arranged, and the body having another hook-like structure extending from the body diametrically opposite the said first hook-like structures, said last hook-like structure being substantially centrally between the ends of said body, a roller and means to journal the same on said last hook-like structure, adjacent the body and being one side thereof, and a pair of rollers and means to journal the rollers on the body portion adjacent one end thereof in working relation to their respective said last hook-like structure and hook-like structure adjacent said last end of the body and being on the opposite side of the body from that of said first roller, said rollers serving as means on which an anchor line will engage to avoid friction at the time of tightening the line as one end thereof is anchored to said snatch link.

HARRY O. KOCH.

REFERENCES CITED

The following references are of record in the file of this patent:

UNITED STATES PATENTS

| Number | Name | Date |
|---|---|---|
| 222,328 | Stoddard | Dec. 2, 1879 |
| 979,691 | Owen | Dec. 27, 1910 |
| 1,433,557 | Kruttschnitt | Oct. 31, 1922 |
| 2,357,478 | Koch | Sept. 5, 1944 |
| 2,370,358 | Koch | Feb. 27, 1945 |